US006974375B1

(12) United States Patent
Stevenson

(10) Patent No.: US 6,974,375 B1
(45) Date of Patent: Dec. 13, 2005

(54) DOUBLE VENT DUST COLLECTION HOOD WITH INSPECTION LIGHTING, STORAGE SHELF AND SANDPAPER DISPENSERS

(76) Inventor: Philip A. Stevenson, 315 Lincoln Ave., Vineland, NJ (US) 08360

( * ) Notice: Subject to any disclaimer, the term of this patent is extended or adjusted under 35 U.S.C. 154(b) by 0 days.

(21) Appl. No.: 10/945,696

(22) Filed: Sep. 21, 2004

(51) Int. Cl.[7] ................................................. F24F 7/00

(52) U.S. Cl. ........................ 454/67; 454/56; 126/299 F

(58) Field of Search .............................. 454/49, 56, 57, 454/58, 67; 126/299 F, 299 R, 299 D

(56) References Cited

U.S. PATENT DOCUMENTS

| 2,082,374 | A | * | 6/1937 | Angus | 454/67 |
| 4,040,042 | A | * | 8/1977 | Mayer | 454/340 |
| 4,553,992 | A | * | 11/1985 | Boissinot et al. | 96/117.5 |
| 4,852,468 | A | * | 8/1989 | Harris | 454/56 |
| 5,112,373 | A | * | 5/1992 | Pham | 96/142 |

* cited by examiner

Primary Examiner—Derek S. Boles
(74) Attorney, Agent, or Firm—Donald W. Meeker

(57) ABSTRACT

A sanding hood has a bottom vent for above a bottom shelf attached to a sanding bench with the shelf aligned with the top of the bench. A series of halogen lights attach above the bottom vent to shine on the bench. An upper shelf above the lights shields the worker's eyes from the lights. The upper shelf has sandpaper dispenser rolls and a flat top for storage.

5 Claims, 2 Drawing Sheets

DOUBLE VENT DUST COLLECTION HOOD WITH INSPECTION LIGHTING, STORAGE SHELF AND SANDPAPER DISPENSERS

BACKGROUND OF THE INVENTION

1. Field of the Invention

The present invention relates to dust collection hoods and particularly to a dust collection hood used with an existing sanding bench, which is provided with both a low table level dust collection vent and an airborne dust collection vent, lights for illuminating the work surface for inspection, a storage shelf that shields the user's eyes from the light, and sandpaper dispensers.

2. Description of the Prior Art

Substances such as dust, smoke, fumes, gas, and other harmful constituents often affect the health of employees. Various dust collecting techniques have been developed, such as a process in which the contaminated substances are collected by suction through means of a dust collection hood. This process is based upon the technique of sucking and removing generated contaminants through means of a dust collection hood installed opposite to or within the vicinity of the contamination source.

Most prior art devices do not provide double vacuum dust hoods with one lower vent for dust particles and one higher vent for airborne particles. They also lack a combination of other features useful in a sanding operation, such as high-power lighting, eye shading for the worker, and sandpaper dispensers.

U.S. Pat. No. 5,410,120, issued Apr. 25, 1995 to Taylor, shows a welding enclosure assembly which includes: a central work chamber; a plurality of horizontally spaced welding work stations within the central work chamber; an exhaust chamber beneath and generally coextensive with the central work chamber; a floor over the exhaust chamber, underlying and substantially coextensive with the central work chamber, and including vents operative to allow air to pass through the floor between the central work chamber and exhaust chamber; an exhaust fan for exhausting air from the exhaust chamber; a blower arranged to establish a positive air pressure in the plenum chamber; and a ceiling over and substantial coextensive with the central work chamber, underlying the plenum chamber, and including air registers operative to pass air downwardly through the ceiling from the plenum into the central work chamber for passage downwardly through the central work chamber and through the floor vents into the exhaust chamber for removal by the exhaust fan. The various parameters of the enclosure assembly are selected to establish a steady substantially laminar downward flow of air over substantially the entire horizontal area of the central work chamber at a velocity sufficient to entrain the welding fumes generated at the plurality of horizontally spaced welding work stations and move the fumes downwardly to the exhaust chamber for exhaust by the exhaust fan.

U.S. Pat. No. 2,082,374, issued Jun. 1, 1937 to Angus, concerns a lighted exhaust ventilating hood for industrial and other purposes.

U.S. Pat. No. 5,749,779, issued May 12, 1998 to Wilburn, describes a movable overhead ventilation assembly and filtering method for use in a work facility to be positioned in close proximity to a source of airborne environmental material. The ventilation assembly includes a supporting frame located within the work facility. The frame includes a longitudinally-disposed overhead track. A movable chassis is carried by the track. A ventilation housing is carried by the chassis for overhead translational movement of the ventilation housing within the work facility. The ventilation housing includes a plurality of walls, and has at least two openings therein defining respective inlet and outlet zones thereof. An exhaust fan is located within the ventilation housing between the inlet zone and the outlet zone for creating an upwardly moving air stream in the area surrounding the source of airborne environmental material. A filtration medium is positioned between the inlet zone and the fan of the ventilation housing for capturing and separating material entrained in the upwardly moving air stream as the air stream enters the ventilation housing through the inlet zone and exits through the outlet zone. A drive wheel moves the chassis along the track within the work facility. Preferably, the ventilation housing further includes first and second light fixtures located on respective sides of the ventilation housing for illuminating the work station. Each light fixture includes a pair of laterally disposed fluorescent bulbs. The required electricity for the light fixtures and exhaust fan may come from any suitable source such as an overhead power supply cord extendable to reach pre-selected electrical outlets located within the work facility.

U.S. Pat. No. 771,507, issued Oct. 4, 1904 to Strong, puts forth an apparatus for drying enameled ware which comprises a fume-collecting hood above each furnace; said hoods each have an exhaust pipe that is connected to a main exhaust duct.

U.S. Pat. No. D136,653, issued Nov. 16, 1943 to Cohen, is for the ornamental design of a combined fume removal hood and lighting fixture.

U.S. Pat. No. 4,926,293, issued May 15, 1990 to Saba, claims a lighting and air freshener fixture for illuminating and for collecting air which is contaminated by a certain substance in the adjacent area of the apparatus. The latter includes a reflector defining an internal cavity in which is mounted a light source. A conduit is mounted to the reflector and communicates with the internal cavity thereof. A blower unit is mounted within the reflector for drawing contaminated air and expelling it through the conduit. Advantageously, a filter element is located within the conduit to remove the contaminant from the air mass passing through the conduit.

U.S. Pat. No. 4,856,419, issued Aug. 15, 1989 to Imai, is for a process and apparatus for collecting a contaminated substance by means of an upwardly directed suction gas flow caused by a dust collection hood, and also includes the provision of a downwardly directed air curtain blown out by means of a forced air blower so as to be parallel to the suction gas flow in a counter-flowing mode as well as annularly surrounding the upwardly directed suction gas flow and the contamination source. By providing the counter-flowing air flows with predetermined relative volume flow rates and velocity flow rates, diffusion of the contaminated substances exteriorly of the downwardly directed annular air flow curtain is effectively prevented.

U.S. Pat. No. 4,475,534, issued Oct. 9, 1984 to Moriarty, provides an energy-saving ventilating system for a restaurant kitchen stove, which provides a first air stream flowing upwardly from a location adjacent the rear edge of the cooking surface, a second air stream discharged into the space in front of the stove where the cook stands and flowing rearwardly above the cooking surface, and a third air stream discharged downwardly from an outlet above the front portion of the cooking surface so as to squeeze the second air stream as the latter flows over the front edge of the cooking surface, causing the second air stream to flow faster in that area, the third air stream acting as an invisible baffle to reduce induction of conditioned air from the kitchen into the space above the cooking surface. The upper wall of the front conduit is located at a height which permits it to be used conveniently as a plate shelf.

U.S. Pat. No. 3,279,681, issued Oct. 18, 1966 to Bandlow, indicates a variable blower which is adapted for incorporation in a barbeque or cooking hood. The blower has a high capacity for exhausting fumes associated with a barbeque. A lamp is also provided for illuminating the cooking area.

What is needed is a double vent dust hood with one lower vent for dust particles and one higher vent for airborne particles as well as a combination of other features useful in a sanding operation, including high-power lighting directly on the work surface with eye shading for the worker, and sandpaper dispensers.

SUMMARY OF THE INVENTION

An object of the present invention is to provide a double vent dust hood with one lower vent for dust particles and one upper vent for airborne particles as well as a combination of other features useful in a sanding operation, including high-power lighting directly on the work surface with a shelf for eye shading for the worker, and sandpaper dispensers and a storage surface on the shelf.

Another object of the present invention is to provide a bottom shelf with a lip which attaches to the edge of a sanding bench with the lower vent just above that lower shelf for maximum intake of particulates from the sanding operation.

In brief, a sanding hood tapers upwardly from a broad base which has a bottom vent for above a bottom shelf along the length of the hood. The bottom shelf is attached by screws to an edge of a sanding bench with the shelf aligned with the top of the bench. A series of halogen lights attach above the bottom vent to shine on the bench. An upper shelf above the lights shields the worker's eyes from the lights. The upper shelf has sandpaper dispenser rolls and a flat top for storage.

An advantage of the present invention is that it collects the particulates from sanding as well as the airborne dust.

Another advantage of the present invention is that it provides a series of bright work lights/inspection lights shining on the sanding bench and shielded by an upper shelf from direct viewing by a worker at the sanding bench.

An additional advantage of the present invention is that it provides a number of sandpaper dispensing rolls for use by a worker at the sanding bench as well as storage space easily accessible to a worker at the sanding bench.

One more advantage of the present invention is that the bottom shelf attaches to the edge of the sanding bench so that all the particulates are picked up by the vent.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
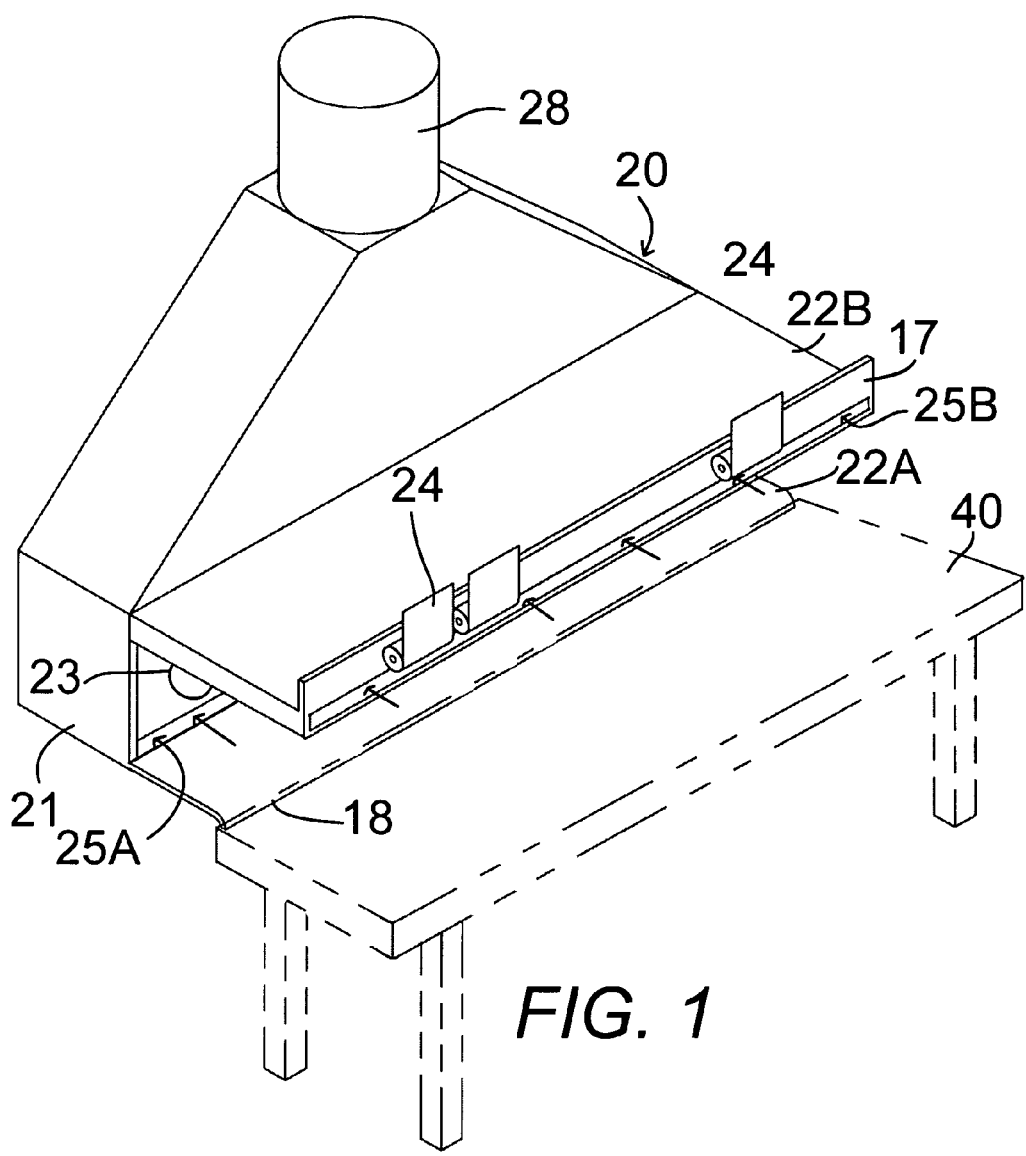
FIG. 1 is a perspective view of the sanding hood assembly of the present invention attached to a sanding table and to a wall adjacent to the sanding table.
Figure 2:
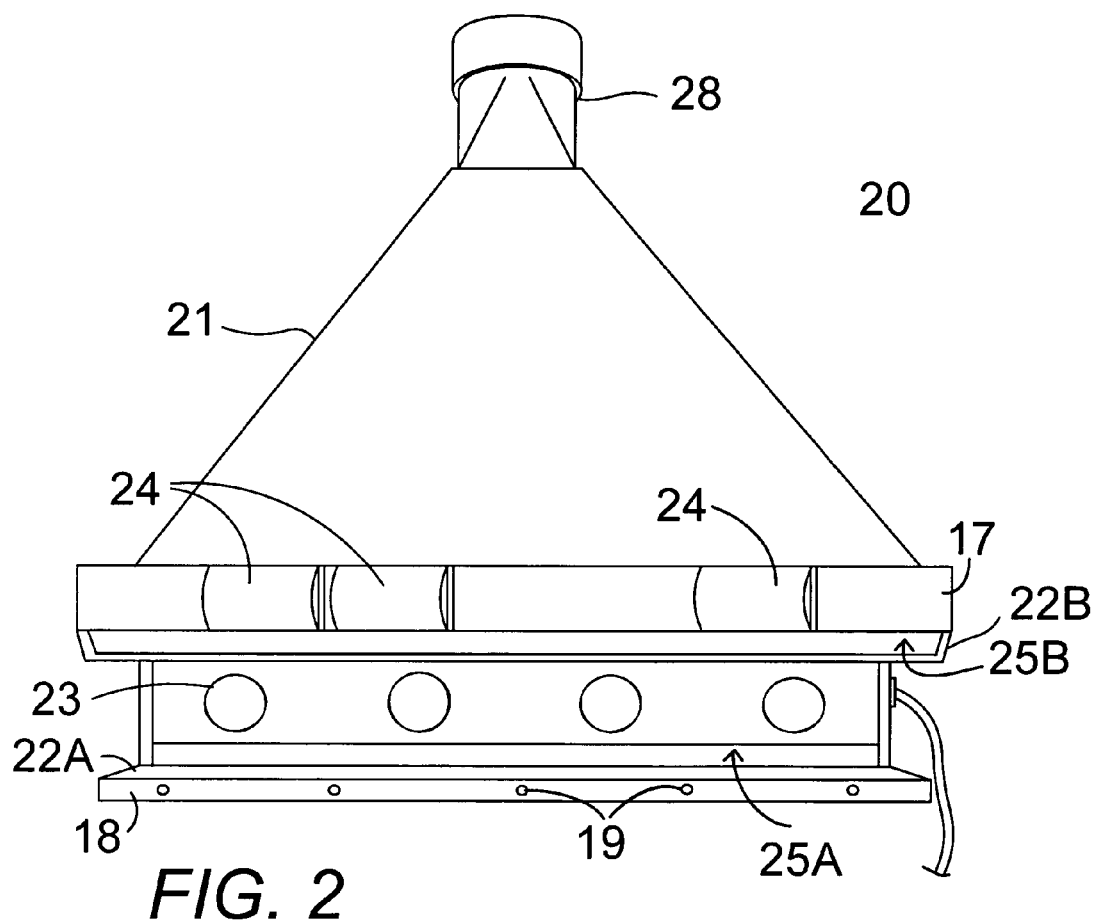
FIG. 2 is a front elevational view of the sanding hood assembly of FIG. 1.

In FIGS. 1 and 2, a sanding hood assembly 20 mounts on a wall and is adapted for use with a sanding table 40.

The sanding assembly comprises a hood structure 21 comprising a rigid shell with a hollow interior tapering from a broad lower portion adapted to be aligned with a sanding table 40 to a narrow top portion communicating with an exhaust outlet 28 and a means, such as an exhaust fan and filtered dust collection system, to draw air and particulates from the exhaust outlet and the hollow interior.

A lower shelf 22A extends from the bottom of the hood assembly and has a downwardly extending lip 18 which may be screwed through holes 19 to an edge of a sanding table 40 with the lower shelf 22A aligned with the top of the sanding table. A first vent opening 25A extends across the entire bottom portion along the lower shelf 22A in communication with the hollow interior. The first vent opening 25A is adapted to intake particulates produced by a sanding operation on the sanding table 40 adjacent to the first vent opening.

A series of lights 23, preferably bright halogen lights, is mounted across the bottom portion of the hood assembly above the first vent opening 25A. The series of lights is adapted to illuminate a sanding operation on the sanding table 40 adjacent to the sanding hood assembly.

An upper shelf 22B protrudes from the hood assembly extending over the series of lights 23, the upper shelf 22B adapted for shielding light from the series of lights 23 from shining directly into eyes of workers performing sanding operations on the sanding table 40 adjacent to the sanding hood assembly. A second vent opening 25B extends across the front edge of the upper shelf communicating with the hollow interior to intake airborne dust produced by a sanding operation on the sanding table 40 adjacent to the sanding hood assembly.

An upwardly extending lip 17 on the upper shelf 22B above the second vent opening 25B preferably has three sandpaper dispenser rolls 24 rotatably attached thereon. The upper shelf 22B has a flat horizontal upper surface 16 adapted to receive articles stored on the upper shelf within reach of a worker performing sanding operations adjacent to the sanding hood assembly.

It is understood that the preceding description is given merely by way of illustration and not in limitation of the invention and that various modifications may be made thereto without departing from the spirit of the invention as claimed.

What is claimed is:

1. A sanding hood assembly adapted for use with a sanding table, the assembly comprising:

a hood structure comprising a rigid shell with a hollow interior tapering from a broad lower portion to be aligned with a sanding table to a narrow top portion communicating with an exhaust outlet and a means to draw air and particulates from the exhaust outlet and the hollow interior, a first vent opening extending across the broad lower portion in communication with the hollow interior, the first vent opening to intake particulates produced by a sanding operation on a sanding table adjacent to the first vent opening, a series of lights mounted across the bottom portion above the first vent opening, the series of lights to illuminate a sanding operation adjacent to the sanding hood assembly, an upper shelf protruding from the bottom portion extending over the series of lights, the upper shelf to shield light from the series of lights from shining directly into eyes of workers performing sanding operations adjacent to the sanding hood assembly, a second vent opening in the upper shelf communicating with the hollow interior, the second vent opening to intake airborne dust produced by a sanding operation adjacent to the sanding hood assembly.

2. The sanding hood assembly of claim 1 further comprising a bottom shelf extending from the bottom portion below the first vent opening, the bottom shelf to be secured to a sanding table level with a sanding table.

3. The sanding hood assembly of claim 1 further comprising at least one sandpaper dispenser roll rotatably attached to the upper shelf.

4. The sanding hood assembly of claim 1 wherein the second vent opening extends across a front of the upper shelf.

5. The sanding hood assembly of claim 1 wherein the upper shelf has a flat horizontal upper surface to receive articles stored on the upper shelf within reach of a worker performing sanding operations adjacent to the sanding hood assembly.

* * * * *